United States Patent

[11] 3,557,902

| [72] | Inventors | Neil F. Brown<br>Antioch, Ill.;<br>James F. Stulac, Racine, Wis. |
|---|---|---|
| [21] | Appl. No. | 748,827 |
| [22] | Filed | July 30, 1968 |
| [45] | Patented | Jan. 26, 1971 |
| [73] | Assignee | Outboard Marine Corporation<br>Waukegan, Ill.<br>a corporation of Delaware |

[54] AIR INTAKE SILENCER
10 Claims, 5 Drawing Figs.

[52] U.S. Cl. ............................................. 181/35,
181/50, 181/53, 181/40; 115/17; 123/198
[51] Int. Cl. ................................................ F01n 7/10,
F01n 1/10; F02b 77/00
[50] Field of Search .......................................... 181/33.04,
35.1, 53, 40, 33, 33.4, 35; 123/198, 198E; 115/17, 18

[56] References Cited
UNITED STATES PATENTS
| 2,078,754 | 4/1937 | Day | 181/35(.1) |
|---|---|---|---|
| 2,322,895 | 6/1943 | Steensen | 181/35(.1) |
| 2,756,736 | 7/1956 | Kiekhaefer | 123/198(E) |
| 2,815,742 | 12/1957 | Kiekhaefer | 181/33(.4) |
| 3,195,530 | 7/1965 | Heidner | 181/33(.4) |
| 3,204,619 | 9/1965 | Rubinowitz et al. | 123/198X |

FOREIGN PATENTS
| 1,374,264 | 8/1964 | France | 181/33(.04) |
|---|---|---|---|
| 465,365 | 5/1937 | Great Britain | 181/35(.1) |
| 554,524 | 7/1943 | Great Britain | 181/40 |

*Primary Examiner*—Robert S. Ward, Jr.
*Attorney*—Wheeler, Wheeler, House & Clemency

ABSTRACT: Disclosed herein is a marine propulsion device having an air intake silencer in the form of a housing defining, in part, an air induction passage including an air supply or expansion chamber in communication with the carburetor inlets for each cylinder. The expansion chamber contains sufficient air to supply engine air requirements for more than one piston stroke thereby reducing pressure pulsations in the induction passage and intake noises. Engine noises are decreased by a sound-absorbing pad located in a connecting passage between the expansion chamber and carburetor inlets.

PATENTED JAN 26 1971

Inventors
Neil J. Brown
James F. Stulac
By
Wheeler, Wheeler, House & Clemency
Attorneys

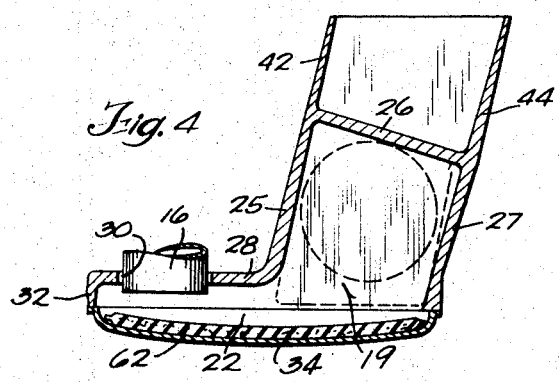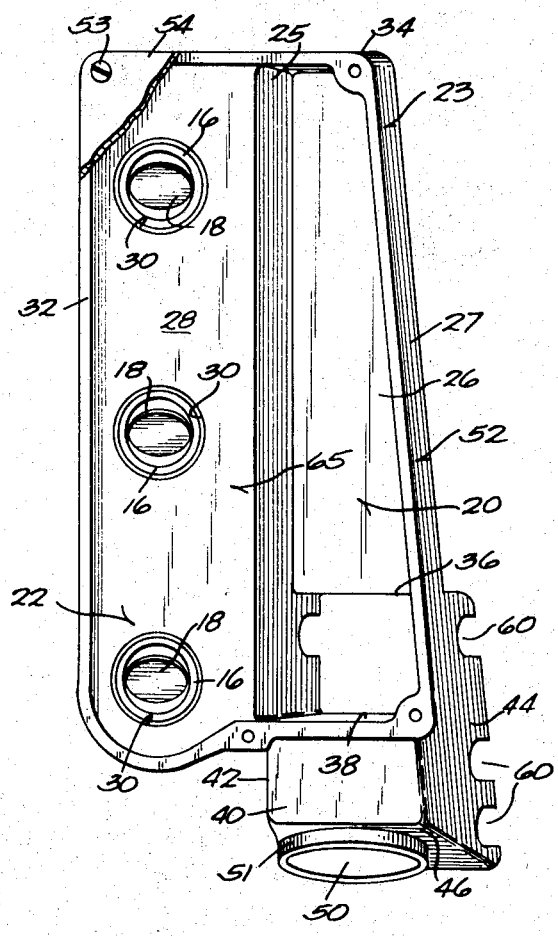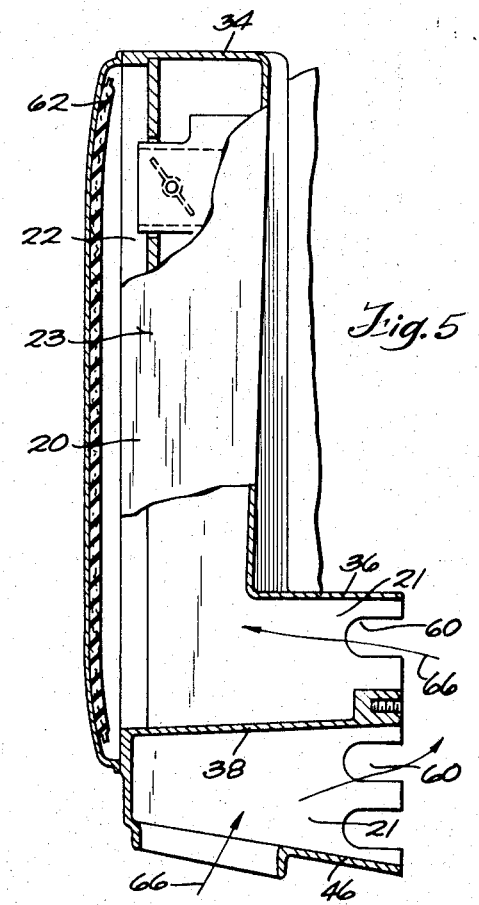

3,557,902

AIR INTAKE SILENCER

BACKGROUND OF INVENTION

The invention relates to marine propulsion motors and more particularly to a silencer for reducing air intake noises in outboard motors caused by pulsating air flow and pressure waves in the intake system during induction of air into the carburetor intake ports.

SUMMARY OF INVENTION

The present invention provides an air induction passage which minimizes air inlet noises by the provision of an air supply or expansion chamber which has a volume equal to several times the amount of air required during induction for one cylinder.

An internal combustion engine creates pulsating air flow in the intake system as well as pressure waves as it breathes. The air flow pulses and the pressure waves must both be controlled to reduce inlet noise. The peak demand of air during induction is drawn from the air already within the supply chamber. The air within the supply chamber is then replenished by a flow of air from the inlet which is more uniform than the flow entering the carburetors. Accordingly, the air flow pulses and pressure waves are greatly reduced.

The air induction passage comprises a housing having an elongated air supply chamber located adjacent the side of the powerhead, a relatively narrow connecting passage and a tortuous inlet passage which enhances the noise reduction capability of the intake silencer. The connecting passage is defined, in part, by a cover provided with a noise absorbing pad which absorbs high frequency noises emitted by the carburetors.

Further objects and advantages of the invention will become apparent from the following description and accompanying drawings.

DRAWINGS

FIG. 3 is an enlarged perspective view of a housing which forms a portion of the air induction system shown in FIG. 1.

FIG. 4 is a plan view of the housing shown in FIG. 2 and a portion of the engine.

FIG. 5 is a side view in fragmentary section of the housing shown in FIG. 3.

DETAILED DESCRIPTION

Figure 1:
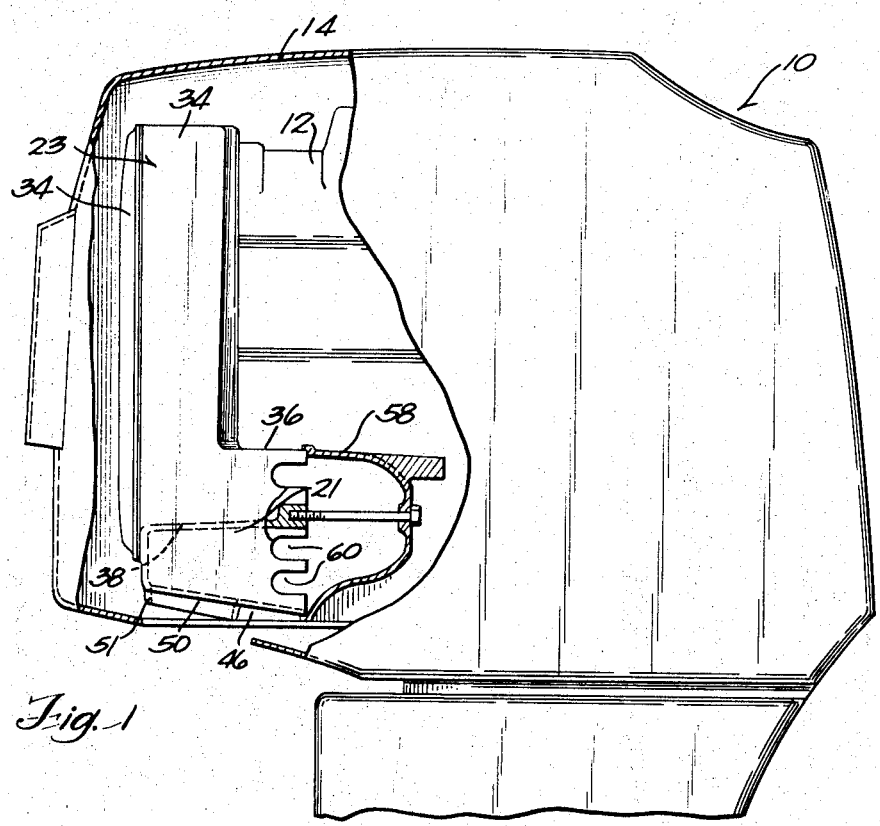
FIG. 1 is a partially broken away fragmentary sectional view of a marine propulsion unit embodying the air induction system of the invention.

In the drawings, FIG. 1 shows a marine propulsion unit which is generally designated 10 and which includes an engine or powerhead 12 enclosed by a cowling or engine cover 14. The powerhead is provided with three cylinders (not illustrated) with each of the cylinders having a separate carburetor with an air inlet 16 (FIGS. 3, 4) controlled by a butterfly valve 18.

In accordance with the invention means are provided defining an air induction passage 19 for supplying atmospheric air to the carburetor inlets 16. The air induction passage 19 includes an elongate air supply chamber 20, an air inlet passage or passage portion 21 connecting the supply chamber 20 with the atmosphere and an elongate connecting passage or passage portion 22 which connects the air supply chamber 20 with the inlets 16.

Figure 2:
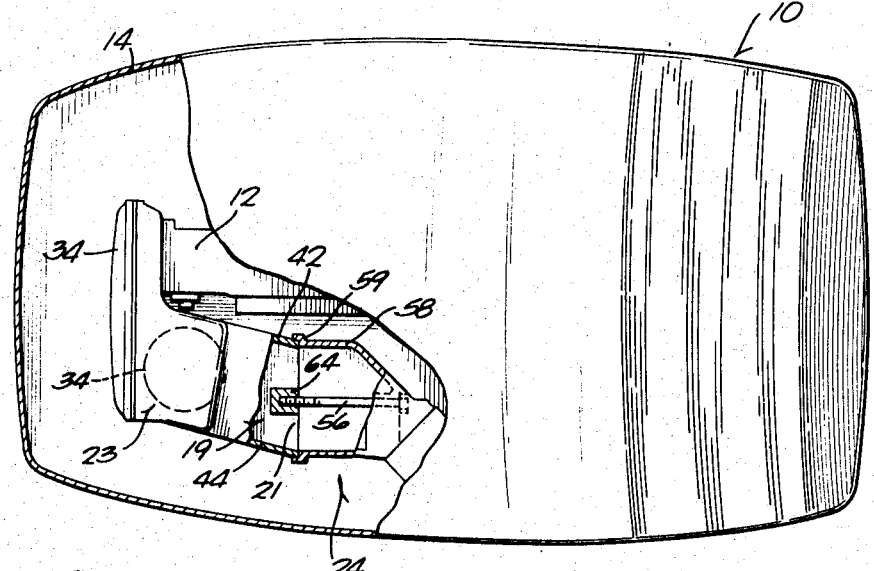
FIG. 2 is a plan view of the marine propulsion unit shown in FIG. 1.

In the disclosed construction the means defining the air induction passage 19 includes a housing 23 (FIG. 3) which separates the air induction passage 19 from the general area or region 24 (FIG. 2) under the cowling 14 and which is located between the cowling 14 and the powerhead 12.

The housing 23 includes a first wall 25 (FIG. 3), a second wall 26 connected to the first wall 25 and a third wall 27 which is connected to the second wall 26 and which is in opposed spaced relation with the first wall 25. The housing 23 also includes a fourth wall 28 which is connected to the first wall 25, extends over the carburetor inlets 16 and has three apertures 30 for receiving the carburetor inlets 16. The fourth wall 28 also has an out-turned flange 32 which extends along three margins of the fourth wall 28. The housing 23 has a top wall 34 which is connected to the walls 25, 26 and 27, a partition 36 in spaced relation with the top wall 34 and an intermediate bottom wall 38 which is connected to the walls 25, 27 and is in opposed spaced relation with the top wall 34 and the partition 36.

The housing further includes a lower partial front wall 40 (FIG. 3) which depends from the intermediate bottom wall 38. Also included are lower sidewall portions 42 and 44 and a bottom wall 46 which is in opposed spaced relation with the intermediate bottom wall 38 and which is connected to the front wall 40 and the lower sidewall portions 42 and 44. The bottom wall 46 has an inlet 50 defined by a depending annular flange 51. The top wall 34, third wall 27 and intermediate bottom wall 40 have margins or edges coplanar with the edge of the out-turned flange 32 on the fourth wall 28, thus forming a continuous housing edge 52. A cover 54 is secured in abutting engagement with the edge 52 by bolts 53.

The air supply chamber 20 is defined by the cover 54, the first, second and third walls respectively 25, 26, 27 and the intermediate bottom wall 38. The connecting passage 22 is defined by the fourth wall 28, the out-turned flange 32 and the cover 54.

The air inlet passage 21 is defined by the intermediate bottom wall 38, partition 36, front wall 40, bottom wall 46 and a bell-shaped housing 58 (FIGS. 1, 2) which has a marginal flange 58 which engages the partition 36, lower side wall portions 42, 44, and bottom wall 46 to form an elbow or bend around the intermediate bottom wall 38. The housing 58 is secured to the housing 23 by a bolt 56 which is threadably received in a boss 64 located on the partition 36. The tortuous flow path around the intermediate bottom wall and through the bell-shaped housing 58 and between the partition 36 and intermediate bottom wall 38 reduces audible engine noises and pressure pulsations in the inlet 50. As shown in FIG. 1, the inlet 50 communicates directly with the atmosphere rather than with the region 24 between the cowling 14 and the powerhead 12.

Noises at a frequency higher than the breathing frequency are reduced by a series of notches or apertures 60 which are located in the lower sidewall portions 42, 44 of the housing 20 and which communicate with the area 24 between the cowling 14 and the powerhead 12.

To reduce high frequency sound waves emitted from the carburetors and engine, the cover 34 is provided with a pad 62 which can be constructed of fiberglass covered with polyvinyl chloride, or any other appropriate sound-absorbing material. Since the connecting passage 22 is relatively narrow, the majority of the sound waves emitted from the carburetors will be directed against the pad 62 and absorbed or otherwise dissipated. Sound waves emitted from the air supply chamber toward the carburetor inlets 16 will also be absorbed.

In operation of an engine embodying the air induction passage of the invention, the air requirements for any one cylinder during induction are supplied by air which is contained with the supply chamber 20 and which follows the path indicated by arrows 65 (FIG. 3). Air in the expansion chamber 20 is replenished by air flow indicated by the arrows 66 through the air inlet passage 21 (FIG. 5). The expansion chamber minimizes inlet noises by reducing the air flow pulses and pressure waves created by induction during engine operation. Locating the air supply chamber 20 adjacent the side of the powerhead 12 permits the use of a larger chamber than would be practical in the area 70 at the end of the powerhead between the carburetor inlets and the cowling 14.

Various of the features of the invention are set forth in the following claims.

We claim:

1. In a marine propulsion unit having a powerhead with a plurality of cylinders, each of said cylinders having a piston and a carburetor with an air inlet, the improvement comprising means defining an air induction passage including an air supply chamber which communicates with said carburetor air inlets and with the atmosphere and which has a volume greater than the displacement of one piston so that the air requirements for one stroke of one of said cylinders can be satisfied by the air contained within said chamber.

2. A marine propulsion unit having a powerhead with a plurality of cylinders, each of said cylinders having a piston and a carburetor with an air inlet, means defining an air induction passage including an air supply chamber communicating with the atmosphere and having a volume greater than the displacement of one piston so that the air requirements for one stroke of one of said cylinders can be satisfied by the air contained within said chamber, and a connecting passage communicating between said air supply chamber and said carburetor air inlets and having a length equal to the length of said air supply chamber, said air supply chamber being open along its full length to said connecting passage.

3. A marine propulsion unit in accordance with claim 2 wherein said connecting passage is defined, in part, by a wall in opposed spaced relation from said carburetor air inlets, said wall being covered on the side adjacent said inlets with a noise absorbing pad, and wherein pressure waves emitted from said air inlets and said air supply chamber are directed against said pad.

4. A marine propulsion unit in accordance with claim 1 wherein said air supply chamber has a volume greater than the displacement of all the pistons.

5. A marine propulsion unit in accordance with claim 1 including an air inlet passage communicating between said air supply passage and the atmosphere, said air inlet passage defining a tortuous flow path.

6. The combination of a marine propulsion unit having a powerhead with a plurality of cylinders, each of said cylinders having a piston and a carburetor air inlet and a housing connected to said powerhead, said housing having a first wall, a second wall connected to said first wall, a third wall connected to said second wall and spaced from said first wall, a fourth wall connected to said first wall along a line spaced from the connection of said first wall and said second wall, said fourth wall extending over said carburetor inlets and having apertures receiving said inlets, an out-turned flange extending along three margins of said fourth wall, a top wall connected to said first, second and third walls at the upper margins thereof, a partition in opposed spaced relation to said top wall and connected to said first, second and third walls and extending transversely therefrom, an intermediate bottom wall in opposed spaced relation to said partition, said intermediate bottom wall being connected to said first and third walls, said top wall and said intermediate bottom wall and said third wall having margins coplanar with the margin of said flange on said fourth wall to form a continuous edge, and a cover in engagement with said margins of said housing walls and said flange to form both an elongate supply chamber and an elongated connecting passage communicating with said supply chamber and said carburetor inlets.

7. The marine propulsion unit of claim 6 including lower sidewall portions of said first and third walls, a bottom wall connecting said lower sidewall portions and spaced from said intermediate bottom wall, an air inlet in said bottom wall, and a second housing connected to said lower sidewall portion, said partition and said intermediate bottom wall to form an air inlet passage connecting said air inlet with said air supply chamber.

8. The marine propulsion unit of claim 6 including a cowling which is spaced from and surrounds a portion of said powerhead and wherein said first, second and third walls of said air induction passage are located adjacent the side of said powerhead between the powerhead and said cowling.

9. The improvement of claim 7 including a plurality of apertures in said lower side walls to afford communication of said inlet passage with the area between said cowling said powerhead.

10. In a marine propulsion unit including an engine powerhead with a plurality of cylinders, each of said cylinders having a carburetor air inlet, the improvement comprising means defining an air induction passage for supplying air to said cylinders, said passage having an air inlet in communication with the atmosphere, a supply chamber having a volume greater than the volume of any of said cylinders and being connected to said carburetor air inlets, and an elongated connecting passage which extends the full length of and communicates with said supply chamber and which has a thickness and volume substantially less than said supply chamber.